United States Patent [19]

Kuwayama

[11] Patent Number: 4,723,154
[45] Date of Patent: Feb. 2, 1988

[54] IMAGE READING APPARATUS

[75] Inventor: Takeshi Kuwayama, Yokohama, Japan

[73] Assignee: Canon Kabushiki Kaisha, Tokyo, Japan

[21] Appl. No.: 5,775

[22] Filed: Jan. 21, 1987

[30] Foreign Application Priority Data

Jan. 30, 1986 [JP] Japan .................................. 61-18757

[51] Int. Cl.$^4$ ............................................. G03B 27/68
[52] U.S. Cl. ......................................... 355/52; 355/8; 355/47; 355/55
[58] Field of Search ...................... 355/43, 47, 48, 52, 355/55, 8, 11, 66; 350/527, 167, 420, 243

[56] References Cited

U.S. PATENT DOCUMENTS

| | | | |
|---|---|---|---|
| 3,157,883 | 11/1964 | Easter | 355/52 X |
| 3,644,037 | 2/1972 | Larraburu | 355/52 |
| 3,700,325 | 10/1972 | Harper | 355/47 X |
| 4,298,271 | 11/1981 | Sugiura et al. | 355/52 X |
| 4,523,838 | 6/1985 | Yamada | 355/66 |
| 4,650,317 | 3/1987 | Oushiden et al. | 355/8 X |
| 4,678,321 | 7/1987 | Inokuchi | 355/52 |

Primary Examiner—Richard A. Wintercorn
Attorney, Agent, or Firm—Fitzpatrick, Cella, Harper & Scinto

[57] ABSTRACT

When directing a slit-like image information light to an imaging lens through a condensing lens, the refractive power of the condensing lens is made to differ between the lengthwise direction and the slit width direction of the slit light beam, whereby the light is effectively received without the read image being deteriorated. Also, when a convergent light transmitting member array is used as the imaging lens, the refractive power of the condensing lens is made to differ between the lengthwise direction of the array and a direction orthogonal to the lengthwise direction of the array, whereby the light is effectively received without the read image being deteriorated.

23 Claims, 7 Drawing Figures

IMAGE READING APPARATUS

BACKGROUND OF THE INVENTION

1. Field of the Invention

This invention relates to an image reading apparatus having light condensing means such as a Fresnel lens for causing an image information light to enter imaging means for imaging the light on a light-receiving portion. In particular, the invention relates to an apparatus for reading an image by slit exposure or an image reading apparatus using a convergent type transmitting member array as imaging means.

2. Related Background Art

In recent years, the projection of an image light onto a Fresnel lens or the like to read the image of a copying apparatus, an image reader or the like has been contemplated as shown in Japanese Laid-Open Utility Model Application No. 162139/1983, Japanese Laid-Open Utility Model Application No. 27550/1984, Japanese Laid-Open Patent Application No. 198439/1984, Japanese Laid-Open Patent Application No. 198440/1984, U.S. patent application Ser. No. 602,012 (filed on Apr. 19, 1984), U.S. Pat. No. 4,120,580 and U.S. Pat. No. 4,027,962.

In such an apparatus, it is the usual practice to cause a projected light beam to travel toward an imaging lens for forming an image on the light-receiving portion by a condensing lens such as a Fresnel lens.

As such light condensing means, use has been made of a lens whose refractive power is rotation-symmetrical. However, in an apparatus wherein an image light is obtained by slit exposure for the purpose of making the apparatus compact, particularly an apparatus in which a convergent light transmitting member array comprising small lenses (particularly of short focus) arranged in the form of an array is used as imaging means, the quantity of received light has been insufficient or the received light image has been disturbed in some cases.

The cause of the problem occurring when use is made of a convergent light transmitting member array will hereinafter be described with reference to FIGS. 5A and 5B of the accompanying drawings.

FIG. 5A is a schematic cross-sectional view taken in the lengthwise direction of the array.

In the figure, reference numeral 1 designates an original having image information. The original 1 is illuminated by an illuminating light source, not shown. Reference numeral 5 denotes a projection lens for projecting an image information light. The projected light from this projection lens 5 is condensed by a Fresnel lens 7 and directed to a convergent light transmitting member array 9. This array 9 causes the image information light to be imaged on a photosensitive medium 10 which is a light-receiving portion. Reference numeral 8 designates an original supporting table for supporting an original thereon. The original supporting table 8 is capable of reading the image of an original 1 as well as the image of the original supported on the original supporting table 8.

Where a convergent light transmitting member array is used, to effectively direct a light beam to the photosensitive medium 10, it is preferable that as shown in FIG. 5A, in the lengthwise direction of the array 9, the light beam from the projection lens 5 be caused to travel in the direction of the optical axis of the individual convergent type light transmitting members, i.e., in a direction substantially orthogonal to the original supporting table 8.

Also, in a direction perpendicular to the lengthwise direction of the array 9, the light beam having reached the original supporting table 8 with the aid of the projection lens 5 may preferably be caused to travel toward the pupil of the convergent light transmitting member array 9. However, the refractive powers of the Fresnel lens 7 in both directions are equal and therefore, when the refractive power is made proper in the lengthwise direction of the array 9 (the state shown in FIG. 5A), there occurs a phenomenon that in a direction orthogonal to the lengthwise direction of the array 9, the light does not effectively enter the convergent light transmitting member array as shown in the cross-sectional view of FIG. 5B.

Therefore, loss of the quantity of light occurs and the problem of insufficient light occurs in the light-receiving portion.

Conversely, if the refractive power of the lens is made greater to increase the quantity of light to the light-receiving portion, the angle of incidence onto the array will become greater in the lengthwise direction of the array 9. This will not only result in loss of the quantity of light, but also will vary the length of the optical path, which in turn will result in a blurred image. This tendency becomes greater toward the end in the lengthwise direction.

Similarly, in the case of slit exposure, the slit light beam is of a substantially rectangular shape and therefore, it is not preferable that the refractive power in the lengthwise direction of the slit light beam become too great. This tendency becomes more remarkable as the ratio of the length of the slit light beam in the lengthwise direction thereof and the slit width of the slit light beam becomes greater.

SUMMARY OF THE INVENTION

It is an object of the present invention to provide an image reading apparatus which can effectively utilize a light and will not cause deterioration of images when a light beam is condensed on a convergent light transmitting member array by light condensing means.

It is another object of the present invention to provide an image reading apparatus which can effectively utilize a slit light beam and will not cause deterioration of images when a slit-exposed light beam is condensed and directed to imaging means.

It is still another object of the present invention to provide an image reading apparatus which is capable of reading the image of an original supported on an original supporting table and reading an image light projected onto the original supporting table from other portion than the original supporting table and which can also effectively utilize the light and accurately read an image during the reading of the image light from other portion than the original supporting table.

It is yet another object of the present invention to provide a condensing lens which is capable of effectively and accurately condensing a slit-like image light.

Further objects of the present invention will become apparent from the following detailed description.

DESCRIPTION OF THE PREFERRED EMBODIMENTS

Figure 1:
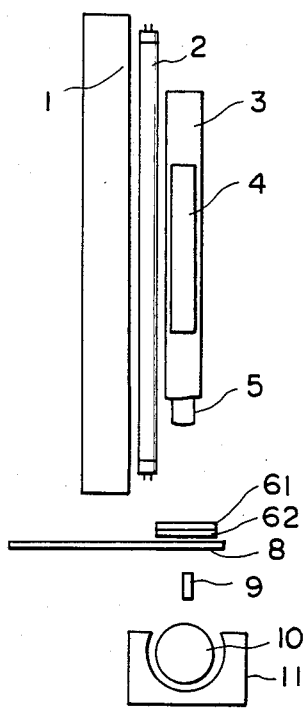
FIG. 1 is a cross-sectional view of an embodiment of the present invention.

The present invention will hereinafter be described with reference to the drawings in which functionally similar members are given similar reference numerals.

Figure 2:
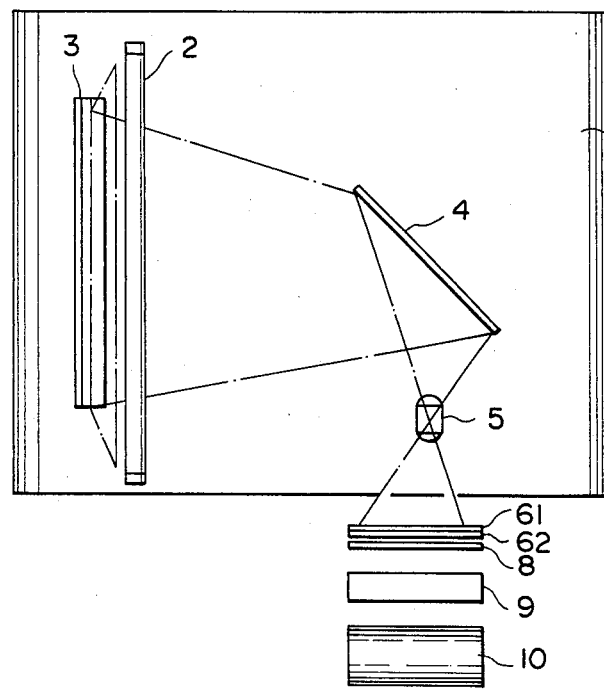
FIG. 2 is a front cross-sectional view of the embodiment shown in FIG. 1.

FIG. 1 is a schematic cross-sectional view of a board-writing recording apparatus to which the present invention is applied and which is capable of reading the image of an original placed on an original supporting table and reading an image light obtained at a position different from the original supporting table, and FIG. 2 is a front view thereof. In these figures, reference numeral 1 designates a writing board to be copied which is capable of recording and erasing by a writing tool, reference numeral 2 denotes an illuminator such as a fluorescent lamp for illuminating the board 1, reference numerals 3 and 4 designate a first reflecting mirror and a second reflecting mirror for directing the image of the writing board to a projection lens 5, reference numeral 61 denotes a Fresnel-like cylindrical lens having its refractive power set in the lengthwise direction of the array to cause the light beam from the projection lens 5 to travel in the lengthwise direction of the array which is perpendicular to the original supporting table, reference numeral 62 designates a Fresnel-like cylindrical lens having a refractive power in a direction perpendicular to the lengthwise direction of the array and having its refractive power set to cause almost all of the light beam from the projection lens to travel toward the pupil of a convergent light transmitting member, reference numeral 9 denotes a convergent light transmitting member array, and reference numeral 10 designates a drum-like photo-electric photosensitive medium on which the image light is imaged.

Light condensing means comprises the Fresnel lenses 61 and 62, and a slit light beam is condensed on the array 9 by these.

In the above-described construction, the writing board 1 is suspended on two shafts and endlessly moved and the image thereon is slit-exposed by the fixedly disposed illuminator 2 and projected onto the original supporting table by the first reflecting mirror 3, the second reflecting mirror 4 and the projection lens 5. The light beam projected onto the original supporting table by said projection lens is made into a substantially parallel light beam with respect to the lengthwise direction of a convergent light transmitting member array by the cylindrical lens 61. On the other hand, the cylindrical lens 62 polarizes the light beam from the projection lens in a direction perpendicular to the lengthwise direction of the array and causes such light beam to travel toward the pupil of the convergent light transmitting member. The image on the writing board 1 is efficiently formed on the photosensitive medium 10 by the cylindrical lenses 61 and 62.

The cylindrical lens herein referred to so has a refractive power in one direction and includes all of Fresnel-like and cylindrical shapes.

Disposed around the photosensitive medium 10 are various process means 11 for forming an image, such as a charger, a transfer device, a separator, a cleaning device and a fixing device. By these process means, an electrostatic latent image is formed on the photosensitive medium to which the image light has been applied, and the electrostatic latent image, after visualized, is recorded as a semi-permanent image on a recording material.

Although the image forming process and the various means 11 for carrying out this process are not described, the well-known electrophotographic copying process and apparatus may be applied and detailed description thereof is omitted herein. When the original on the original supporting table 8 is to be copied by the above-described apparatus and when the image information of the writing board 1 is to be copied, the original supporting table 8 is reciprocally moved relative to the array 9 and scanned and the image thereon is exposed on the photosensitive medium 10, in the former case, and the original supporting table 8 is fixed in the position of FIG. 1 and the image thereon is likewise exposed on the photosensitive medium 10, in the latter case.

The cylindrical lens 61 should preferably function to cause the light beam from the projection lens 5 to travel on the original supporting table 8 in the direction of the normal to the original supporting table 8. Accordingly, the focus of the cylindrical lens 61 may be placed on the pupil of the projection lens. That is, the distance between the projection lens and the cylindrical lens 61 is the focal length. Also, the cylindrical lens 62 may have its focal length determined so that an image is formed on the pupil of the projection lens 5 and on the pupil of the convergent light transmitting member 9.

The features of the present invention will now be described in detail.

Figure 3A:
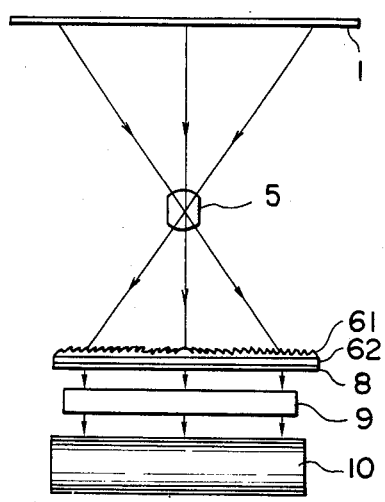
FIGS. 3A and 3B are cross-sectional views illustrating the present invention.
Figure 3B:
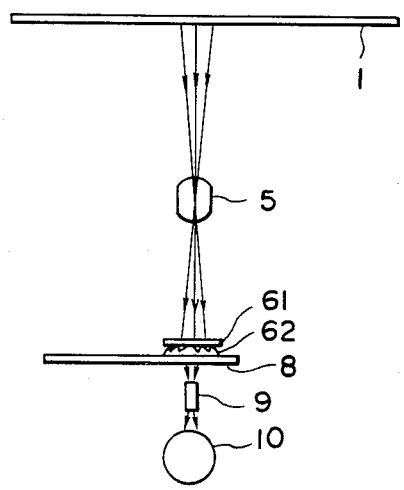

FIG. 3A is a cross-sectional view taken from the lengthwise direction of the array 9, i.e., the lengthwise direction of the slit light beam, and FIG. 3B is a cross-sectional view taken from a direction orthogonal to the lengthwise direction of the array 9.

In the lengthwise direction of the array 9, the slit light beam is refracted into a light beam substantially parallel to the convergent light transmitting member by the cylindrical lens 61 having its refractive power determined relative to said lengthwise direction and therefore, the convergent light transmitting member array causes the image light to be effectively and accurately imaged on the surface of the photosensitive medium 10. At this time, the cylindrical lens 62 has no refractive power in the lengthwise direction of the array 9 and therefore, in this direction, the slit light beam is not subject to the influence of the cylindrical lens 62.

In contrast, in a direction orthogonal to the lengthwise direction of the array 9 (i.e., the widthwise direction of the slit light beam), as shown in FIG. 3B, almost all of the slit light beam is caused to enter the convergent light transmitting member array 9 by the cylindrical lens 62 different in refractive power from the Fresnel lens 61 and having its refractive power determined relative to said direction and having its underside formed flatly so as to be in intimate contact with the original supporting table 8, and loss of the quantity of light does not occur. Due to the facts that this widthwise direction of the slit is the direction in which the original 1 and the original on the original supporting table 8 are slitscanned and images are successively scanned and that the width of the slit light beam is sufficiently small relative to the length thereof in the lengthwise direction of the slit light beam, a great refractive power if secured would not deteriorate the read image.

As described above, the present invention employs light condensing means having suitable different refractive powers in the lengthwise direction of the slit or the convergent light transmitting member array and the direction orthogonal to said lengthwise direction and therefore, any loss of the quantity of light and deterioration of the read image do not occur.

Particularly, the refractive power in the direction orthogonal to the lengthwise direction of the slit or the array is made greater than the refractive power in said lengthwise direction and therefore, the quantity of light received by the light-recieving portion can be increased without the read image being deteriorated.

The light condensing means is not restricted to the above-described embodiment, but may be any combination of a cylindrical lens, a toric lens, etc., or a combination of a lens having the same refractive power in all directions and a lens having a refractive power in one direction, or a single lens whose Fresnel shape differs between the lengthwise direction and the widthwise direction of the slit light beam, or any lenses different in refractive power.

The light condensing means may preferably be of a substantially rectangular shape slightly larger than the slit light beam so as to match the shape of the slit.

Figure 4:
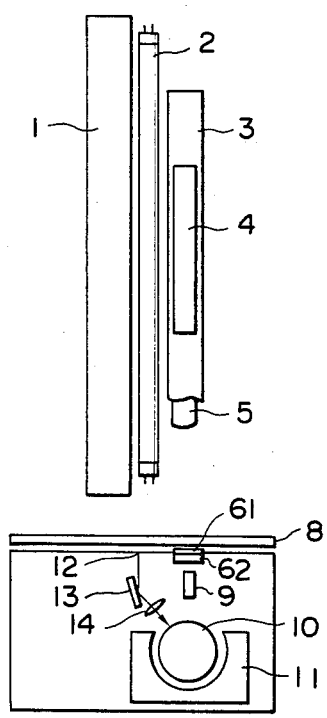
FIG. 4 is a cross-sectional view of another embodiment of the present invention.
Figure 5A:
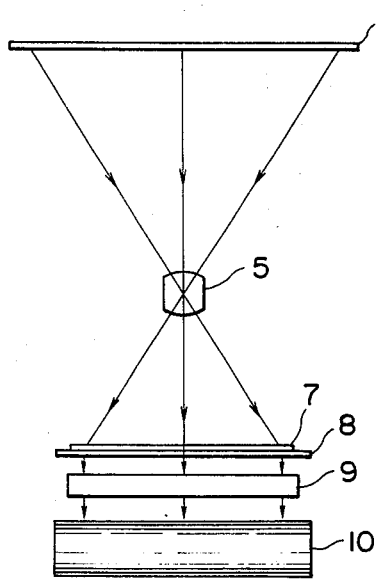
FIGS. 5A and 5B are cross-sectional views illustrating the prior art.
Figure 5B:
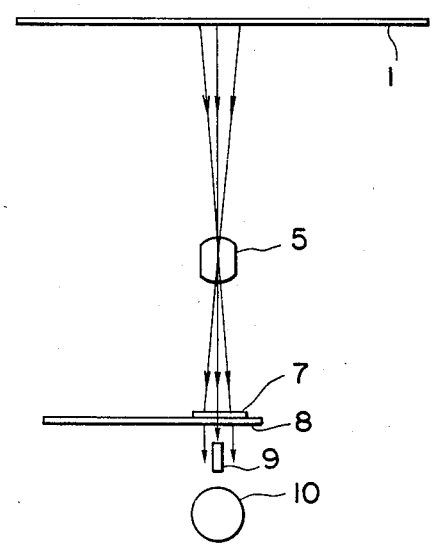

Also, the light condensing means need not be provided on the original supporting table, but may be provided in the optical path upstream of the convergent light transmitting member array as shown in FIG. 4.

In the FIG. 4 embodiment, the light beam to which the original on the original supporting table 8 has been exposed is imaged on the photosensitive medium 10 by an opening portion 12, a mirror 13 and a lens 14 via a path discrete from the path for the image light from the board-writing surface.

Also, the light-receiving portion is not limited to a photosensitive medium, but may be a solid state image pickup device or any other devices which respond to light. Further, means for producing the image light may be a slide film, a microfilm or the like.

The present invention described above covers any combination thereof.

What I claim is:

1. An image reading apparatus comprising:
   optical means emitting a light beam having image information;
   light condensing means for condensing the image information light from said optical means; and
   a convergent type transmitting member array for causing the light beam passed through said light condensing means to be imaged on a light-receiving portion;
   said light condensing means having different refractive powers in the lengthwise direction of the convergent type transmitting member array and in a direction orthogonal to said lengthwise direction.

2. An image reading apparatus according to claim 1, wherein said light condensing means has a greater refractive power in the direction orthogonal to the lengthwise direction of said convergent type transmitting member array than in said lengthwise direction.

3. An image reading apparatus according to claim 1, wherein said light condensing means has a cylindrical lens having a refractive power in the lengthwise direction of the convergent type transmitting member array and a cylindrical lens having a refractive power in the direction orthogonal to said lengthwise direction.

4. An image reading apparatus according to claim 3, wherein at least one of said cylindrical lenses is a Fresnel lens.

5. An image reading apparatus according to claim 1, wherein in the lengthwise direction of the convergent type transmitting member array, said light condensing means makes the light beam into a substantially parallel light beam.

6. An image reading apparatus according to claim 1, wherein said light-receiving portion is a photosensitive medium and the read image is reproduced as a recorded image by process means for image formation provided around said photosensitive medium.

7. An image reading apparatus comprising:
   an original supporting table for supporting an original thereon;
   a convergent type transmitting member array for directing the reflected light from the original supported on said original supporting table to a light-receiving portion;
   an image information light producing portion provided at a location discrete from said original supporting table and emitting an image information light;
   projection means for projecting the image information light obtained from said image information light producing portion onto said original supporting table; and
   field lens means provided on said original supporting table;
   said field lens means having different refractive powers in the lengthwise direction of said convergent type transmitting member array and in a direction orthogonal to said lengthwise direction.

8. An image reading apparatus according to claim 7, wherein said field lens means has a greater refractive power in the direction orthogonal to the lengthwise direction of said convergent type transmitting member array than in said lengthwise direction.

9. An image reading apparatus according to claim 7, wherein said field lens means has a cylindrical lens having a refractive power in the lengthwise direction of the convergent type transmitting member array and a cylindrical lens having a refractive power in the direction orthogonal to said lengthwise direction.

10. An image reading apparatus according to claim 9, wherein at least one of said cylindrical lenses is a Fresnel lens.

11. An image reading apparatus according to claim 7, wherein in the lengthwise direction of the convergent type transmitting member array, said field lens means makes the light beam into a substantially parallel light beam.

12. An image reading apparatus according to claim 7, wherein said field lens means is in contact with said original supporting table during the use of said apparatus.

13. An image reading apparatus according to claim 7, wherein the original supported on said original supporting table and the convergent type transmitting member array are moved relative to each other, whereby the original is slit-exposed.

14. An image reading apparatus according to claim 13, wherein when the image information light is projected from said image information light producing portion, one of said original supporting table and said image information light producing portion is slit-exposed.

15. An image reading apparatus according to claim 13, wherein said image information light producing portion is provided with a recording surface on which recording can be effected by a writing tool and illuminating means for illuminating the recording surface, and the recording surface is slit-exposed.

16. An image reading apparatus according to claim 7, wherein said light-receiving portion is a photosensitive medium and the read image is reproduced as a recorded image by process means for image formation provided around said photosensitive medium.

17. An image reading apparatus according to claim 7, wherein said field lens means is provided near an end of the original supporting table.

18. An image reading apparatus according to claim 7, wherein the length of said field lens means in the lengthwise direction of the convergent type transmitting member array is greater than the length of the convergent type transmitting member array in the lengthwise direction thereof.

19. An image reading apparatus according to claim 7, wherein the width of said field lens means in the direction orthogonal to the lengthwise direction of the convergent type transmitting member array is greater than the width of the convergent type transmitting member array in the direction orthogonal to the lengthwise direction thereof.

20. An image reading apparatus comprising:
    optical means producing a light beam carrying image information;
    light condensing means for condensing the image information light from said optical means; and
    imaging means for causing the light beam passed through said light condensing means to be imaged on a light-receiving portion;
    said light condensing means having a cylindrical lens portion having a refractive power in a first direction and a cylindrical lens portion having a refractive power in a second direction orthogonal to said first direction, and
    wherein said imaging means is a convergent type transmitting member array and said first direction is coincident with the lengthwise direction of said convergent type transmitting member array.

21. An image reading apparatus according to claim 20, wherein said optical means produces an image information light beam by slit exposure and said first direction is coincident with the lengthwise direction of a slit light beam obtained from said optical means.

22. Condensing lens means for condensing a slit-like image light, characterized in that a surface on which the image light is incident is of a substantially rectangular shape, the refractive power in the lengthwise direction of said incidence surface differs from the refractive power in a direction orthogonal to the lengthwise direction of said incidence surface, and the underside of said condensing lens means is flat so as to be able to be in intimate contact with a flat original supporting table.

23. Condensing lens means according to claim 22, wherein the refractive power in the direction orthogonal to the lengthwise direction of said incidence surface is greater than the refractive power in the lengthwise direction of said incidence surface.

* * * * *